(12) United States Patent
Ferlin et al.

(10) Patent No.: US 11,311,433 B2
(45) Date of Patent: Apr. 26, 2022

(54) LIFT FOR TELESCOPIC PASSENGER STAIRS FOR BOARDING PASSENGERS IN WHEELCHAIRS ON A PLANE

(71) Applicant: TIPS d.o.o. proizvodno in trgovsko podjetje, Leskovec pri Krskem (SI)

(72) Inventors: Janez Ferlin, Zdole (SI); Marjan Smole, Podsreda (SI); Robert Pustavrh, Leskovec pri Krskem (SI); Rok Bratusa, Bistrica ob Sotli (SI); Silvo Sneberger, Brezice (SI)

( * ) Notice: Subject to any disclaimer, the term of this patent is extended or adjusted under 35 U.S.C. 154(b) by 541 days.

(21) Appl. No.: 16/447,840

(22) Filed: Jun. 20, 2019

(65) Prior Publication Data

US 2019/0388286 A1    Dec. 26, 2019

(51) Int. Cl.
*B64F 1/315*     (2006.01)
*A61G 3/06*      (2006.01)

(52) U.S. Cl.
CPC .............. *A61G 3/063* (2013.01); *B64F 1/315* (2013.01); *A61G 2220/10* (2013.01)

(58) Field of Classification Search
CPC ...... A61F 3/063; A61F 2220/10; B64F 1/315; B66B 9/08; B66B 9/083; B66B 9/0846; B66B 9/0853; B66B 9/0869; B66B 9/16; B66B 9/187
See application file for complete search history.

(56) References Cited

U.S. PATENT DOCUMENTS

| 3,625,306 A | * | 12/1971 | Sauer | B64F 1/315 |
| | | | | 182/69.4 |
| 3,664,456 A | * | 5/1972 | Smith, Sr. | B64F 1/315 |
| | | | | 182/62.5 |
| 3,891,062 A | * | 6/1975 | Geneste | B66B 9/16 |
| | | | | 187/245 |
| 3,910,264 A | * | 10/1975 | Mahieu | B64F 1/315 |
| | | | | 182/69.4 |
| 4,438,830 A | * | 3/1984 | Born | B66B 9/083 |
| | | | | 187/201 |

(Continued)

FOREIGN PATENT DOCUMENTS

| DE | 20219336 U1 | 2/2003 |
| DE | 10336449 A1 | 5/2005 |

(Continued)

*Primary Examiner* — Michael A Riegelman
(74) *Attorney, Agent, or Firm* — Voyer Law

(57) ABSTRACT

A lift apparatus for telescopic passenger stairs enabling disabled passengers with impaired mobility to board a plane and to telescopic aeroplane passenger stairs with the said lift. The lift apparatus moves the lift regardless of the degree of extension of the telescopic staircase, with a moveable guide rail installed into a lower staircase, which can travel to the top of an upper staircase if needed. The guide rail in the lower part serves as a fixed guide rail for the lifting platform, onto which a passenger in a wheelchair is wheeled, wherein the platform moves along the guide rail. When the platform reaches the end of the guide rail, it is locked in place, after which the guide rail itself then moves along the track of the upper part of the staircase, wherein it is connected to the guide rail via wheels. The described movement is enabled by a system comprising an endless chain, guide rollers and wheels, a drive sprocket and a drive, and the said guide rail.

15 Claims, 11 Drawing Sheets

(56) References Cited

U.S. PATENT DOCUMENTS

| | | | | |
|---|---|---|---|---|
| 4,706,779 A * | 11/1987 | Bono | ................. | B66B 9/16 |
| | | | | 182/103 |
| 4,793,437 A * | 12/1988 | Hanthorn | ................. | B66B 9/16 |
| | | | | 182/102 |
| 5,052,521 A * | 10/1991 | Wendt | ................. | B66B 9/083 |
| | | | | 187/202 |
| 5,105,914 A * | 4/1992 | Holden | ................. | B66B 9/0846 |
| | | | | 187/201 |
| 5,125,481 A * | 6/1992 | Shibata | ................. | B66B 9/00 |
| | | | | 187/245 |
| 6,854,147 B1 * | 2/2005 | Ahlsten | ................. | B64D 9/00 |
| | | | | 14/69.5 |
| 10,981,753 B2 * | 4/2021 | Chida | ................. | B66B 9/08 |
| 2006/0182581 A1 * | 8/2006 | Murray | ................. | B66B 9/0869 |
| | | | | 414/541 |
| 2007/0181363 A1 * | 8/2007 | Denison | ................. | B66B 9/16 |
| | | | | 182/48 |
| 2015/0375965 A1 * | 12/2015 | Awerbuch | ................. | B66B 9/0815 |
| | | | | 187/201 |
| 2018/0086601 A1 * | 3/2018 | Okonski | ................. | B66B 9/08 |
| 2019/0388286 A1 * | 12/2019 | Ferlin | ................. | B64F 1/315 |
| 2021/0087019 A1 * | 3/2021 | Chida | ................. | B66B 9/0815 |

FOREIGN PATENT DOCUMENTS

| | | | | |
|---|---|---|---|---|
| GB | 2499408 A * | 8/2013 | ............ | B66B 9/0846 |
| JP | 2009012866 A * | 1/2009 | | |
| WO | 8101397 A1 | 5/1981 | | |
| WO | WO-9719887 A1 * | 6/1997 | ............ | B66B 9/0838 |

* cited by examiner

LIFT FOR TELESCOPIC PASSENGER STAIRS FOR BOARDING PASSENGERS IN WHEELCHAIRS ON A PLANE

CROSS-REFERENCE TO RELATED APPLICATION

This application claims priority from Slovenian Application No. P-201800143, filed Jun. 20, 2018, which is incorporated by reference herein in its entirety.

FIELD

The lift apparatus belongs to the field of workflows and transport, more precisely to the field of devices for boarding passengers on aeroplanes. The lift apparatus relates to a lift for telescopic passenger stairs enabling disabled passengers with impaired mobility to board a plane and to telescopic aeroplane passenger stairs with the said lift.

BACKGROUND

Every day, airports and airport ground staff face issues related to disabled and physically handicapped passengers, whether this is due to injuries or due to excess weight. If boarding takes place via a boarding bridge, these passengers can board in the same way as other passengers; in all other cases, however, a special boarding process for disabled persons must be performed, which is often a time-consuming and costly procedure.

In addition to bridges, the most widespread manner in which passengers board planes is through passenger stairs, which can either be in one piece, one piece with adjustable height (so-called parallelogram stairs), or telescopic stairs, the height of which is adjusted by pulling out the telescopic part and tilting the stairs. These types of stairs are well known and passengers can use them to ascend aboard a plane.

Stairs with a built-in escalator are also known, so that the passenger's activity is not needed. These stairs are not suitable for disabled passengers since they cannot use the stairs, while a wheelchair cannot be safely placed onto the escalator.

Currently, the most commonly used devices for boarding disabled persons are special elevators, so-called ambulance lifts, which are vehicles with a platform that can be moved upwards or downwards vertically, thus enabling the disabled person to bring his/her wheelchair to the doorstep of the aeroplane and then simply drive it inside. Such vehicles are expensive and are therefore not suitable for smaller airports where the number of disabled passengers is not high.

Ramps with an inclined surface replacing the stairs have also been in use; wheelchairs can also move on this ramp, but due to their small inclination, such ramps are extremely long or coiled, once or multiple times.

The general technical problem solved by the lift apparatus is therefore how to design a lifting device enabling safe and reliable boarding of passengers on wheelchairs or passengers with reduced mobility, wherein the device shall allow to be mounted and used on telescopic passenger stairs. At the same time, normal transition of passengers on the stairs, when the lift is not in use, has to be ensured.

STATE OF THE ART

On their website, the company AccessAir displays classic one-piece stairs with a fixed height and a platform for wheelchairs that can be moved along guide rails fixed onto one of the sides of the stairs. The platform can be controlled remotely or via a stationary operating station on the upper platform of the stairs, making it possible for the platform to stop at any height. The platform is foldable (collapsible) in order to take up as little space as possible. The website also states that the solution can be used for telescopic stairs; however, the construction in such case is not explained.

Platforms for wheelchairs, which can be used on one-piece stairs with adjustable height, are known. Document DE20219336 describes height-adjustable passenger stairs with a wheelchair platform that can be moved up and down the stairs via a guide rail installed into the side wall, running along the length of the stairs. Document DE10336449 describes a solution of moving the wheelchair platform up and down the stairs via guide rails installed into both stair rails.

Other known solutions are telescopic stairs with an additional guide rail, along which the platform carrying a wheelchair can be moved. However, said movement is only enabled if the telescopic stairs are in either of their end positions, namely completely extended or completely folded. Such stairs are manufactured by the company Sinfonia. Since aeroplanes are of various heights, which consequently means that their doors are also located at different heights, it must be ensured that the solution also functions on all intermediate stages during the extension of the telescopic part.

Patent application WO8101397 describes a device for easier access of disabled passengers to the plane. The device is mounted onto telescopic stairs and has a seat with fold-up armrests. A part of one of the staircase railings is composed of two parallel rails used to host a multi-section framework comprising a frame and three bearings; its form allows the platform to constantly remain in a vertical position. The platform is attached into the axes of the three bearings, making it possible to slide vertically; while, its position is determined by an additional rail following the course of the stairs. The movement of the platform is powered through a winch. This solution differs from the lift apparatus significantly, since the construction of the guide rails and the drive are not similar.

The aim of the lift apparatus is thus to design a device that can be built into telescopic passenger stairs and that will enable the platform with a wheelchair to travel from the floor to the upper platform, regardless of the degree of extension of the telescopic stairs. The device must function in a reliable and safe manner, whereby the platform is preferably not located too high above the stairs. At the same time, the device has to enable simple removal of the wheelchair platform in order to allow boarding of other passengers.

Description of the Solution of the Technical Problem

Typical telescopic stairs comprise a lower and upper staircase, between which an intermediate platform is located to ensure passage regardless of the degree of extension of the stairs. A top platform is provided at the top of the stairs, the height of which can be adjusted by extending the stairs and levelled with the doorstep of the plane. Entire stairs are usually installed onto the movable system, mostly onto a suitable vehicle.

The design of the lift, which has to be raised and lowered on the telescopic stairs regardless of the degree of extension, must overcome the key problem of the variable length of the stairs, which means various lengths of the path to be travelled by the lifting platform. Additionally, in some designs the upper staircase is wider than the lower staircase. As a consequence, a lateral offset is created on the path of the lifting platform, which has to be addressed at least for telescopic stairs. Furthermore, the part between the lower and upper staircases (the area of the intermediate platform) creates an altitude or a length offset on the path of the lifting platform, which needs to be solved in order to increase the safety of the passenger.

The essence of the lift for telescopic aeroplane passenger stairs enabling passengers in wheelchairs to board a plane is in that it contains a folding (collapsible) platform onto which a wheelchair can be wheeled, wherein the platform is mounted to a guide rail that can be built into one of the sides of the lower staircase of the telescopic stairs. The lift apparatus enables the platform to move along the guide rail with the help of guide rollers (wheels), as well as the movement of the entire guide rail together with the platform, along the telescopic (upper) staircase of the stairs, regardless of its degree of extension, with the help of an endless chain, guide rollers, drive sprocket and drive, wherein the movement of the entire guide rail is only activated when the platform reaches the highest point of the guide rail. In the area of the upper staircase, the guide rail pushes the carriage and consequently the lifting platform. Along the upper staircase, the guide rail is installed into a rail, which represents a standard component of the upper staircases of telescopic stairs, as the carrying wheels of the lower part are running over that part. The movement of the guide rail along the said track is enabled by at least three guide wheels installed in such a way as to ensure both vertical and lateral guiding. An advantage of the lift apparatus is that it comprises only one drive system, which is installed into the lower part of the lower staircase. All movement (including the movement of the platform) arises from the movement of the endless chain and is based on the track-wheel system. The guide rail moves along the lower and the upper staircase with the help of guide rollers, making it possible to continuously function along the entire length of telescopic stairs, thus ensuring a well-supported guide rail in all positions. Accordingly, the problem of moving the lift regardless of the degree of extension of the telescopic stairs is solved.

The lift for telescopic passenger stairs enabling passengers in wheelchairs to board a plane comprises:
- a foldable lifting platform onto which a wheelchair can be wheeled, wherein said platform has a base, two or three inclined ramps, a back part and two safety barriers, and can optionally also have a seat,
- wherein the back of the platform is attached to a carriage, the main component of which is a plate onto which at least three, preferably five, guide wheels are attached,
- wherein the carriage is attached to the guide rail via guide wheels, thus enabling the movement of the carriage and, thus the movement of the platform along the guide rail,
- the guide rail has a lock for locking when the platform lifts the guide rail from the lower staircase and unlocking when the guide rail returns back onto the lower staircase,
- the said guide rail is a long element of an essentially rectangular shape with a C-shaped cross-section and a shorter part on one side, the guide rail also being equipped with at least two, preferably three, guide rollers onto which an endless chain or a wire rope is installed within the guide rail, wherein said endless chain or wire rope is driven via a self-locking gear train enabling the platform to stop at any position,
- a drive driving the lift,
- a brake,
- wherein the platform can be moved along the guide rail and the guide rail can be moved along the upper staircase of the telescopic stairs when the platform is at the highest point of the guide rail.

In addition, the lift can also have a lateral offset and a horizontal shift. If needed, the said lateral offset is solved by installing the guide rail onto the rail of the lower staircase in a way that makes it possible to move along the lower staircase unimpeded. In order to move the guide rail and the platform in one single plane on the upper and the lower part of the stairs, the guide rail can be optionally equipped with at least one distancing element.

The horizontal movement is not an essential feature the platform could move without it. However, in the absence of the horizontal shift the platform would be placed higher above the stair in the upper staircase, meaning that at least the upper inclined plane of the lifting platform should have been longer. The horizontal shift is facilitated with wheels on the back of the lifting platform and with tracks on the carriage and is initiated with a rail above the intermediate platform and guide wheels on the lifting platform. The guide wheels installed onto the carriage on the central axis catch the rail in the area of the intermediate platform, turn around the central axis in order to release the brake, and move the platform due to connection with the rail. At the end of the rail, they return into the initial position, while the brakes and the position of the platform on the additional guide rail lock themselves. The additional guide rail is placed onto the carriage, which moves on the (main) guide rail via its own wheels (guide rollers). In order to ensure safety before moving outside of the area of the main platform, a brake is installed between the lifting platform and the rail for the horizontal movement, wherein said brake is released when the guide wheels are outside of their neutral position due to the contact with the rail. The brake is needed due to the variable inclination of the stairs which, in turn, provokes a variable inclination of the rail for the horizontal movement.

BRIEF DESCRIPTION OF THE FIGURES

As shown in FIGS. 1 and 2, the lift comprises a folding (collapsible) platform 3 onto which a wheelchair can be led, wherein the platform comprises:
- a base 31,
- two or three inclined ramps 32a, 32b, 32c that are movably attached to the base,
- a back part 33, wherein the lower part of the back is attached to the base 31, and folding safety barriers 34a, 34b attached to the left and the right side of the back part 33.

Figure 1:
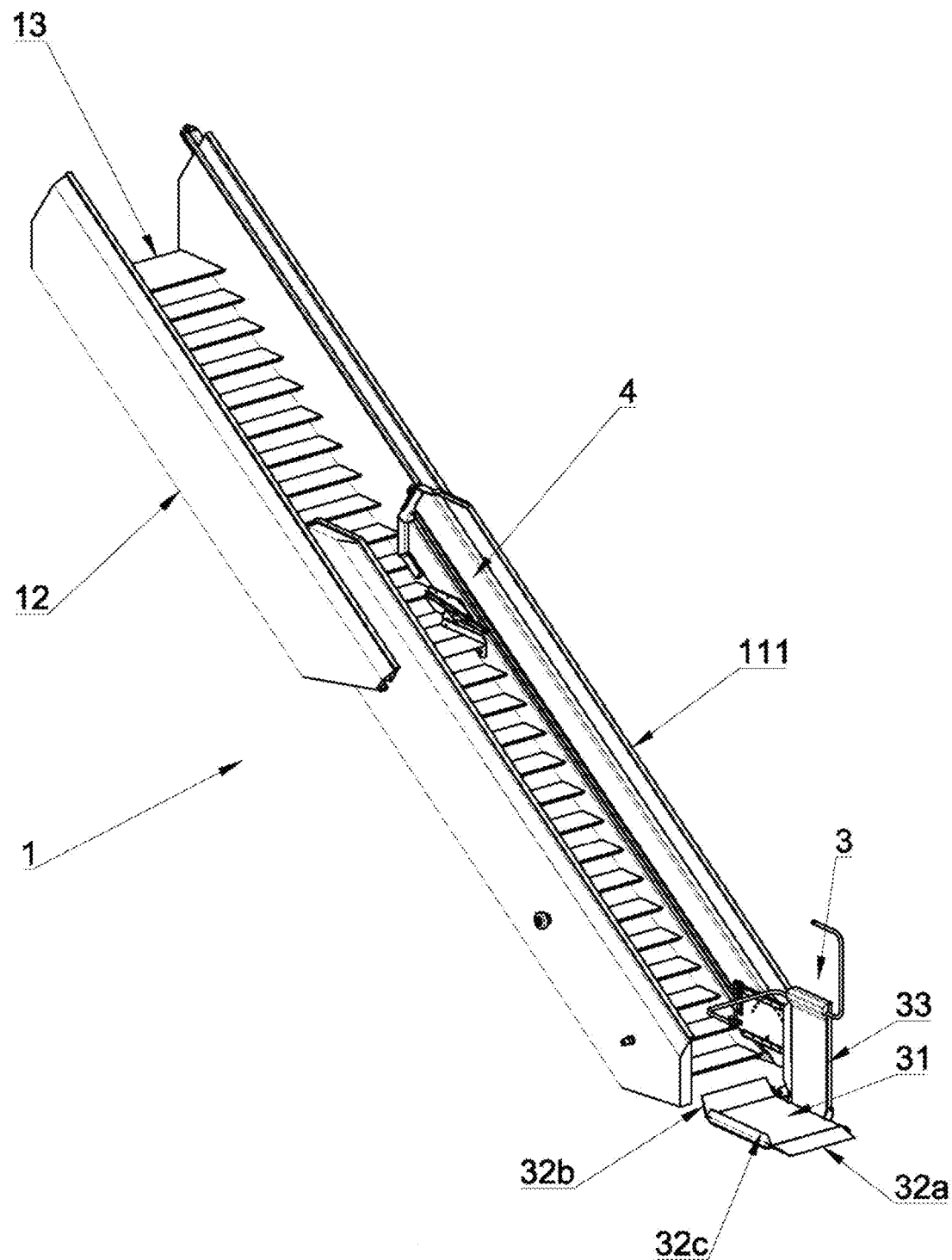
FIG. 1: The lift apparatus placed onto the telescopic passenger stairs in its initial position when the seat is located at the bottom of the stairs
Figure 2:
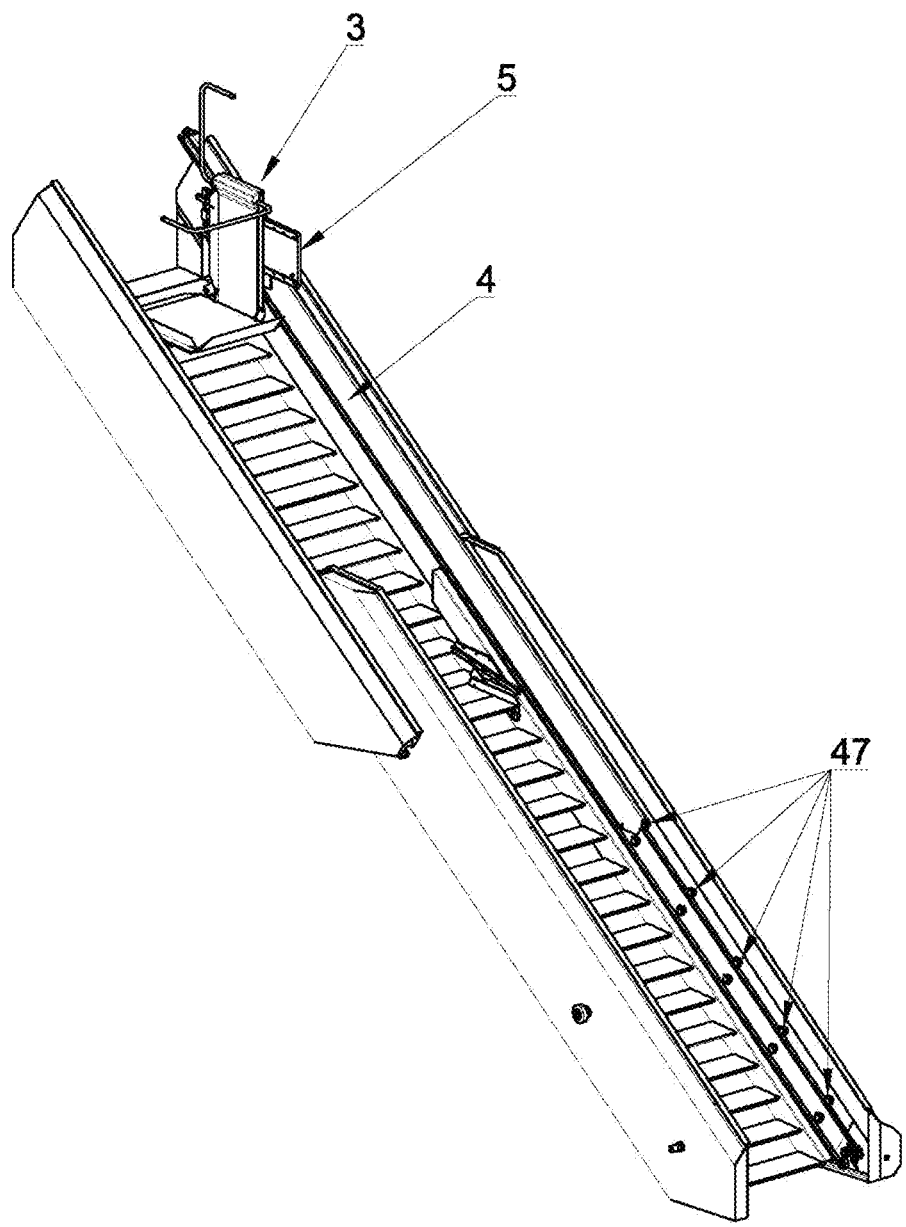
FIG. 2: The lift apparatus of claim 1, placed onto the telescopic passenger stairs in its final position when the seat is located at the top of the stairs

In addition, the platform 3 can also comprise a collapsible seat attached to the front part of the back part 33 so that it in its open state protrudes over the part of the base part 31. The platform 3 is collapsible; the inclined ramps 32a, 32b, 32c and the base part 31 can be moved upwards, making the base part 31 at least approximately parallel to the back part 33. In its open state, the platform 3 extends through most of the width of the staircase 1 (as can be seen in FIG. 2), while in the collapsed state, the platform 3 only takes up a small part of the width of the staircase 1, thus allowing other passengers to pass.

Figure 3:
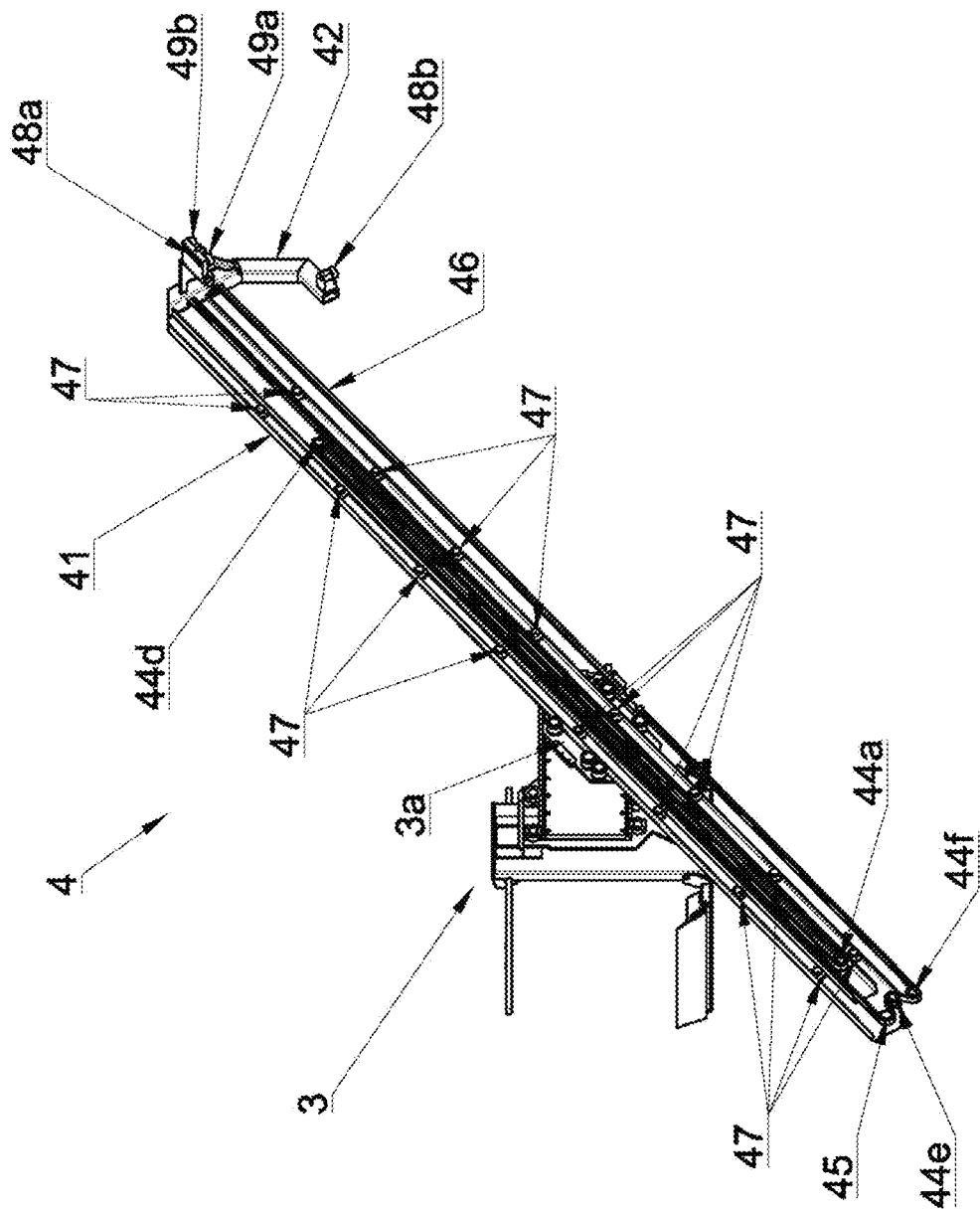
FIG. 3: The guide rail
Figure 3A:
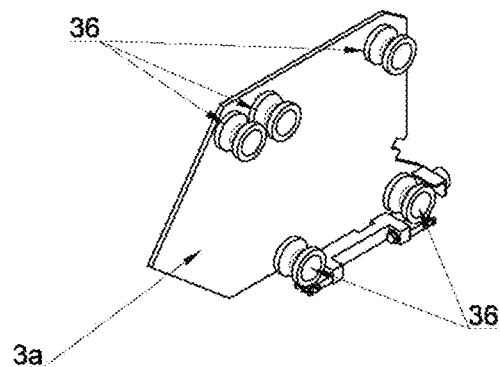
FIG. 3a: The carriage

With the rear part of the back part 33, the platform 3 is attached to the carriage 3a, which is attached to the guide rail 4 with guide wheels 36, as shown in FIG. 3, wherein the said wheels 36 enable the platform 3 to move upwards and downwards along the guide rail 4. FIG. 3a shows the possible design of the carriage 3a. The carriage 3a is actually a plate onto which at least three, preferably five, guide wheels 36 are attached with their position shown in FIG. 3a. Two other components of the carriage are a lower anchorage of the chain and an angle part on the front part where the carriage is locked onto the guide rail.

Figure 12:
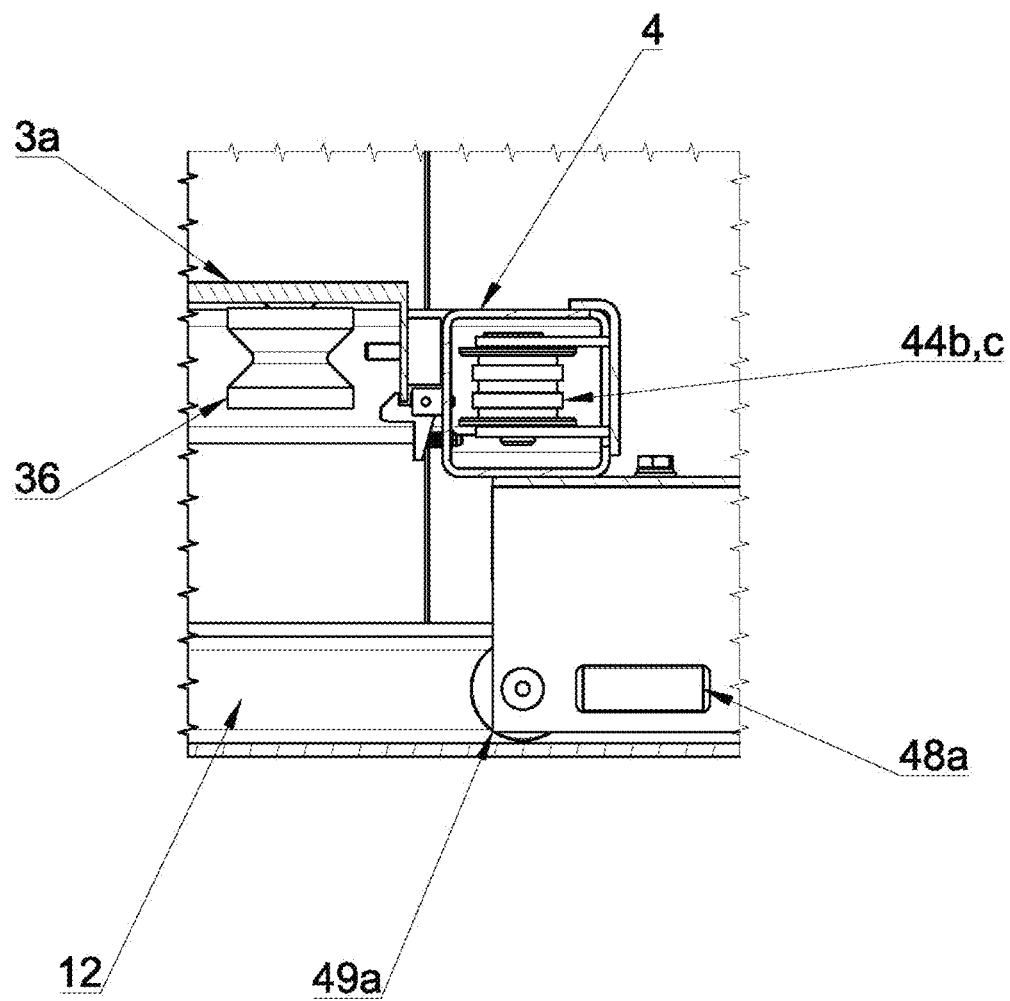
FIG. 12: Lock for locking the carriage to the guide rail The figures and embodiments described below serve as illustrations of the solution of the technical problem and can be adapted without derogating from the basic general design of the lift as defined above and in the claims.

The guide rail 4 is actually a long element in the approximate shape of the letter L, as shown in FIG. 3. Guide rollers 44 are provided within the guide rail 4, wherein the first rollers 44a, 44b, 44c are mounted onto the guide rail itself, while the second rollers 44d, 44e, 44f are mounted into the side of the staircase. The position of two of the first rollers 44b and 44c is visible in FIGS. 5 and 6. Within the guide rail 4, a drive sprocket 45 is mounted onto the lower staircase and is driven with a drive. An endless chain or a wire rope 46 is placed onto the guide rollers 44 and the drive sprocket 45, as shown in FIG. 3. The length of the longer part 41 of the guide rail 4 is approximately similar to the length of the stationary part (lower staircase) of telescopic passenger stairs. Guide rollers 44b, 44c, as well as additional wheels 48a, 48b and 49a, 49b are installed on the shorter part 42 of the guide rail 4. The guide rail 4 is guided along the upper staircase with the help of wheels 48a, 48b, 49a and 49b. The first pair of wheels 48a, 48b laterally guides the guide rail 4, while the second pair of wheels 49a and 49b guides it vertically. The guide rail is additionally equipped with a lock (FIG. 12) ensuring that the carriage cannot descend the guide rail unless the latter is in its lowermost position. The guide rail is equipped with a clamping block, whose position is determined by the lower staircase and a spring. When the guide rail 4 is in its lowermost position, the lower staircase pushes onto the clamping block, overcoming the spring and removing the block out of the way of the carriage. When the carriage pushes the guide rail 4 upwards, it is moved away from the lower staircase. At that time, the spring pushes the block behind the carriage, thus preventing the carriage from descending the guide rail 4.

Figure 4:
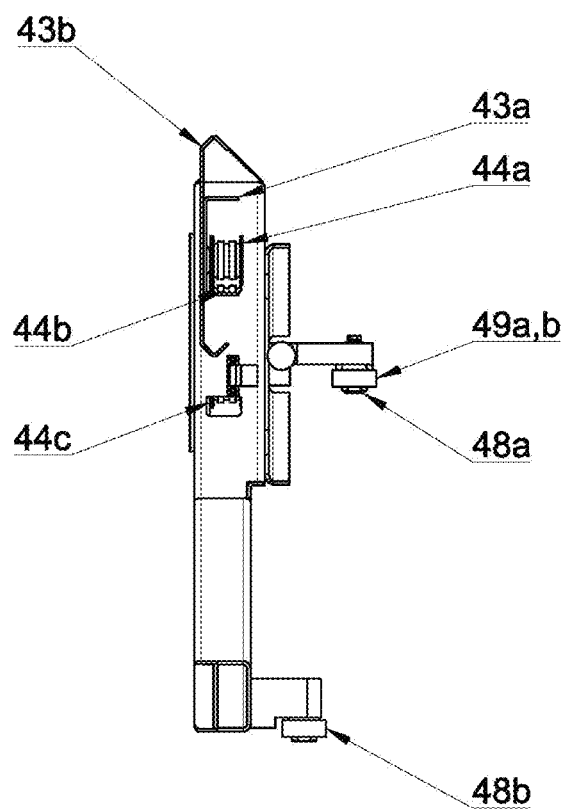
FIG. 4: Side view of the guide rail profile

The longer part 41 of the guide rail 4 has a shape as shown in FIG. 4 and comprises an internal Li-profile 43a, equipped with one of the first rollers 44a, and of an external C-profile 43b, in the middle of which the internal profile is attached. The endless chain or wire rope 46 mostly runs within the internal Li-profile 43a. The U-profile 43a ensures higher rigidity of the guide rail 4, so it is less susceptible to lateral bending due to the weight of the lifting platform 3 and the potential passenger on a wheelchair. Since the guide rail 4 is guided along the rail of the upper staircase, the rigidity is thus additionally increased. If the guide rail 4 had been made of a suitably rigid material or if it were shaped in a way enabling a higher degree of rigidity, the guiding along the rail of the upper staircase could be omitted.

The course of the chain 46 enables the carriage to run along the stationary guide rail 4 and also makes it possible for the guide rail to function telescopically when the carriage is on the top of the guide rail. The chain runs within the guide rail 4 over at least one sprocket (chain wheel) and at least three guide rollers that can also be sprockets. In a possible embodiment, the chain runs over one sprocket 45 and over six guide rollers 44a, 44b, 44c, 44d, 44e and 44f, wherein the roller next to the guiding roller 44e is used to tension the chain. The sprocket 45 and two guide rollers 44e, 44f are located on the lowermost part of the lower staircase (one of the rollers is a tension roller); the upper part of the lower staircase is equipped with one guide roller 44d. Three guide rollers for the chain are installed onto the guide rail—two of them at the uppermost part 44b, c, and one of them on the lower part of the guide rail 44a. The chain is attached to the carriage in the part under the guide rail. The course of the chain over the guide rollers depicted in FIGS. 3, 5 and 6 allows telescopic movement of the guide rail, ensuring the carriage to move along the entire length of the static guide rail; as it reaches the highest point of the guide rail, the chain along with the carriage pulls the guide rail along the length of the upper staircase. Hence, the carriage can travel along the full length of the telescopic stairs, regardless of its degree of extension.

Figure 5:
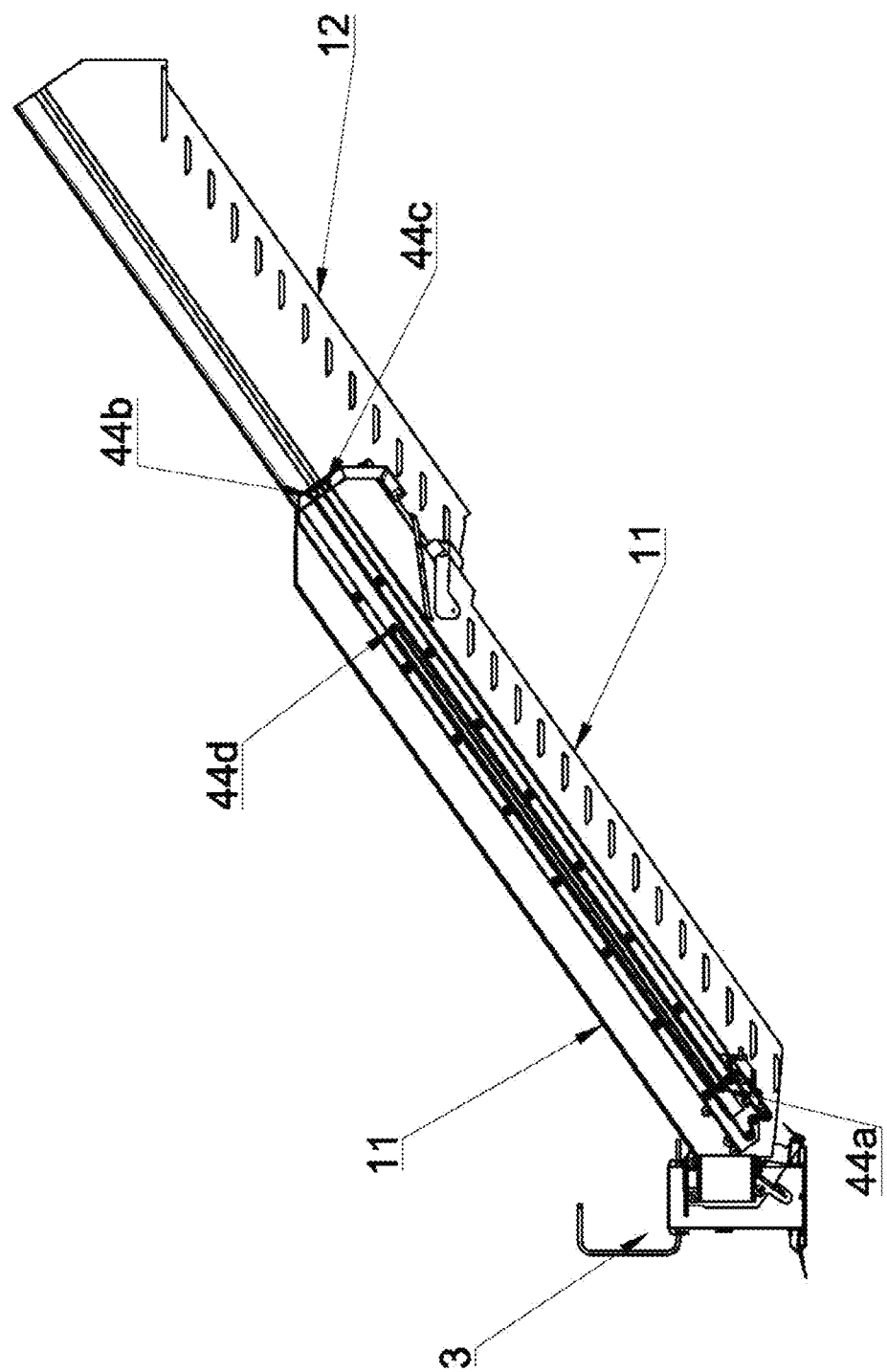
FIG. 5: Interior of the guide rail when it is located on the lower (stationary) staircase of the telescopic passenger stairs
Figure 6:
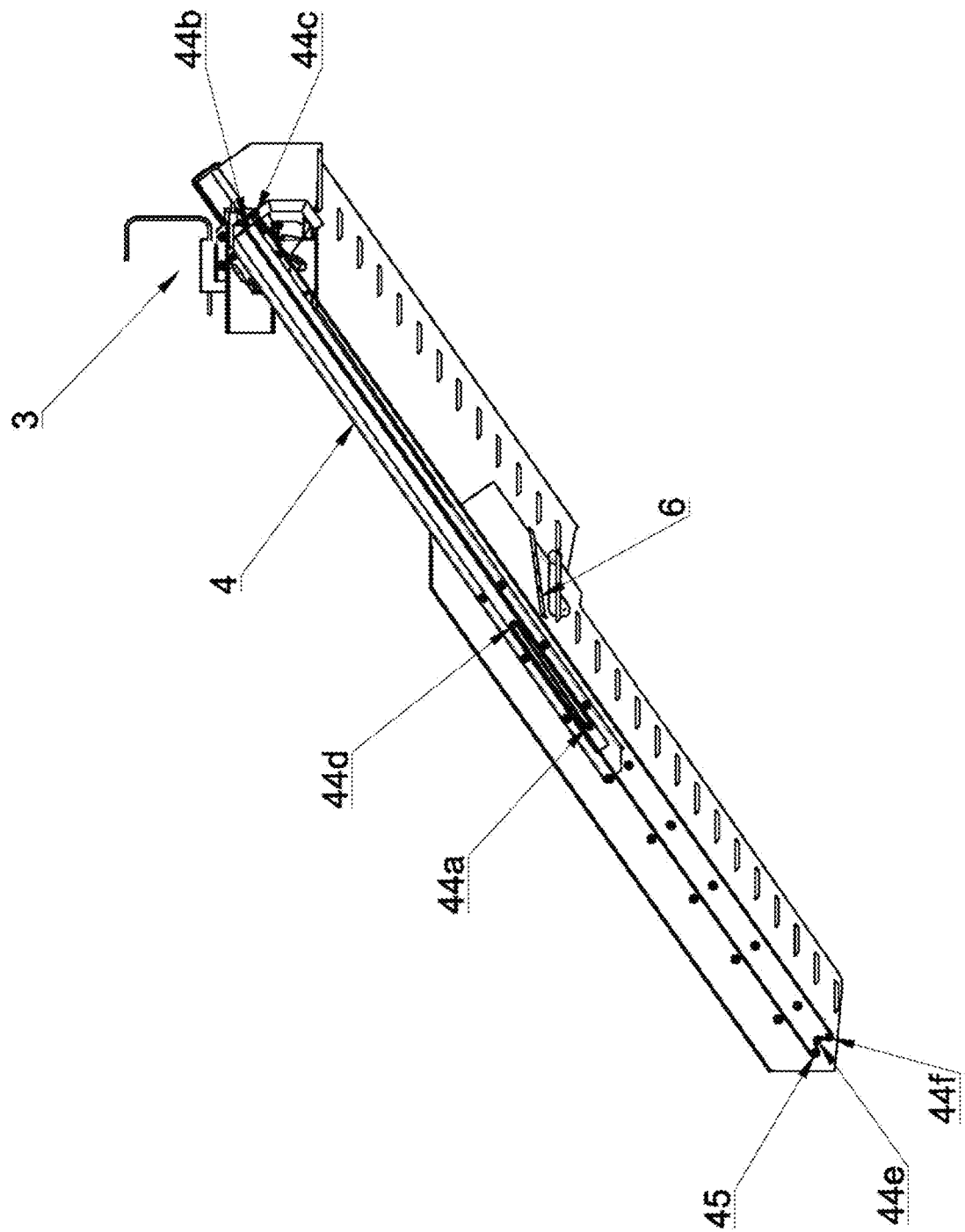
FIG. 6: Inside of the guide rail when it is located on the upper (telescopic) staircase of the telescopic passenger stairs

The movement of the guide rail upwards along the stairs is enabled by wheels 47; during said upwards movement, the distance between the guide rollers 44a and 44d is shortened, thus making it possible for the distance between the guide rollers 44c and 44f to elongate, as can be seen in FIGS. 5 and 6.

Figure 11:
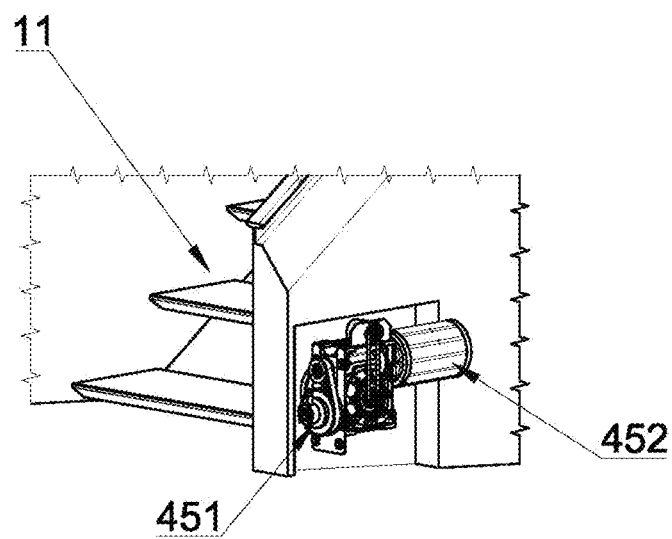
FIG. 11: Self-locking cylindrical gearing with an electric motor and a hand-operated drive

The drive sprocket 45 can be powered electrically, manually, or both electrically and manually. Preferably, it is driven both electrically and manually, in order to allow removal or emergency use of the lift during power outages. A double (combined) drive is enabled by a self-locking gear drive with two exits, wherein one of the exits has an electrical motor and the other has a manual drive device with an actuating lever (crank). A possible implementation is shown in FIG. 11. The lever may be removed and is not attached to the drive during normal operation. It would be possible to implement a hydraulic drive; however, from the point of view of construction, this solution is both more complicated and more expensive. If the platform stops during movement on the guide rail, for example, due to a failure of the drive (electrical motor or any other optional drive), the self-locking gear drive prevents the drive sprocket from turning, thus also preventing the movement of the chain and the platform. The lift 2 further comprises a brake 7, which stops the movement of the platform 3 and/or the guide rail 4. Primary controls for operating the lift are installed on the upper platform and can, additionally, also be installed on the platform itself. Secondary controls may also be provided at the bottom of the stairs.

When the lift apparatus 2 is installed into the side wall 111 of the stairs 1, the transfer to the upper, telescopic part of the stairs in case of known solutions presents a problem in the course of the rail along which the platform is travelling. It must be possible for the platform to shift from the lower staircase of the stairs to the upper staircase. The lift apparatus solves this problem with the lift 2 allowing the platform 3 to travel along the stationary (lower) staircase 11 of the telescopic stairs on the guide rail 4 itself; when it reaches the highest point of the guide rail 4, which matches the end of the bottom staircase 11 of the stairs 1, the platform 3 locks itself in place, while the movement of the entire guide rail 4 is activated. Since the platform 3 travels to the uppermost part of the guide rail 4, it first reaches the end of the staircase 1 or the upper platform 13 of the staircase 1, which is connected to the doorstep of the plane. At this point, the movement of the guide rail 4 is stopped and the position is fixed by the self-locking gear drive that enables stopping of the guide rail at any point.

Figure 7A:
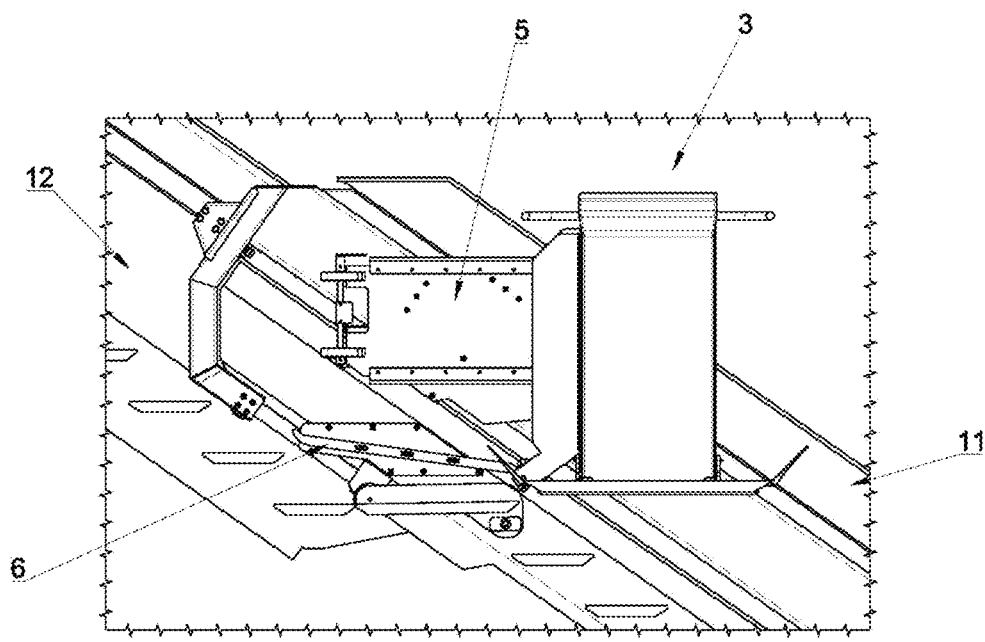
FIG. 7a: Initial state of the horizontal movement of the platform from the side of the stairs
Figure 7B:
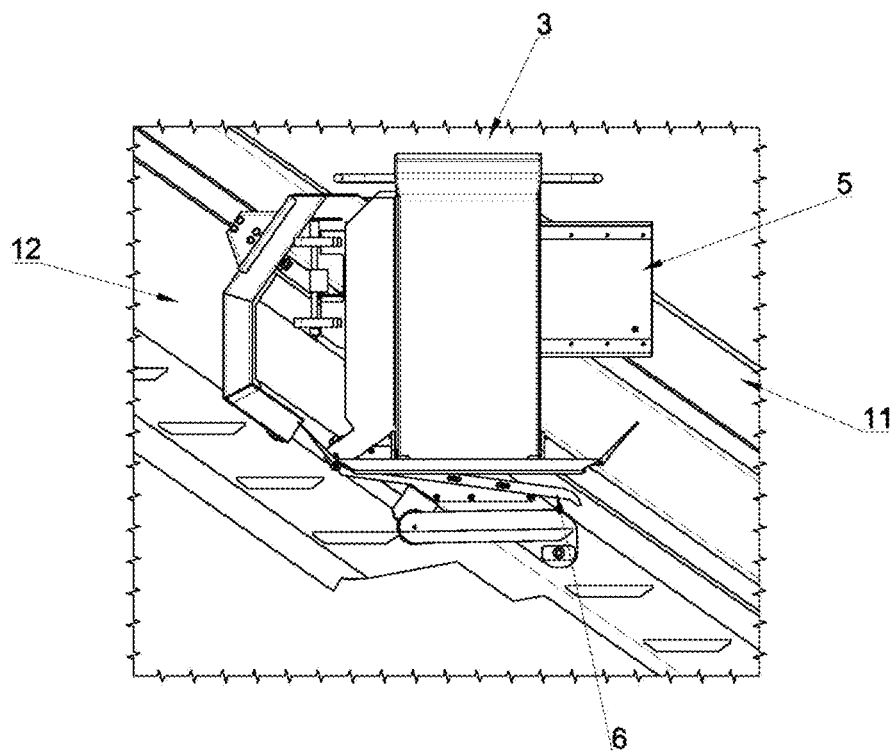
FIG. 7b: Final state of the horizontal movement of the platform from the side of the stairs

The movable guide rail 4 thus solves the problem of movement of the platform 3 regardless of the degree of extension of the telescopic staircase. In addition, two important factors contributing to the passenger's welfare during boarding with the lifting platform 3 are the comfort and the feeling of being far away from the ground. The comfort is ensured with the rigid guiding system enabling a smooth running of the carriage 3a and with the drive to control speed. The feeling of not being far away from the ground is provided by the lifting platform 3 as it travels a little above the staircase. When the lifting platform 3 passes over the stairs of the upper staircase, the travelling height of the platform 3 would increase significantly, thus also increasing the feeling of being far away from the ground, if there were no measures taken to prevent that. In order to do so, the lifting platform 3 above the intermediate platform is moved towards the stairs of the upper staircase and then the platform continues its way upwards at a similar distance from the staircase as in the lower staircase. The implementation of the horizontal movement is shown in FIGS. 7 and 8.

The horizontal movement is enabled by the plate 5 for horizontal shift, attached to the plate of the carriage 3a, onto which rails 51a, b are attached above and below, wherein the platform 3 is equipped with four suitable wheels (minimally three or more) on the back part 33, making it possible to move the lifting platform 3 through the rails 51a, b of the horizontal shift plate 5. Preferably, the plate 5 is separated from the carriage 3a in order to enable the storage of the lifting platform 3 outside of the area of the staircase. For storage, the plate 5 is provided with two teeth used to fix the platform 3 onto the carriage 3a, and a lock 3b for securing the lifting platform 3 onto the carriage 3a, as it is shown in FIG. 8a.

Figure 8A:
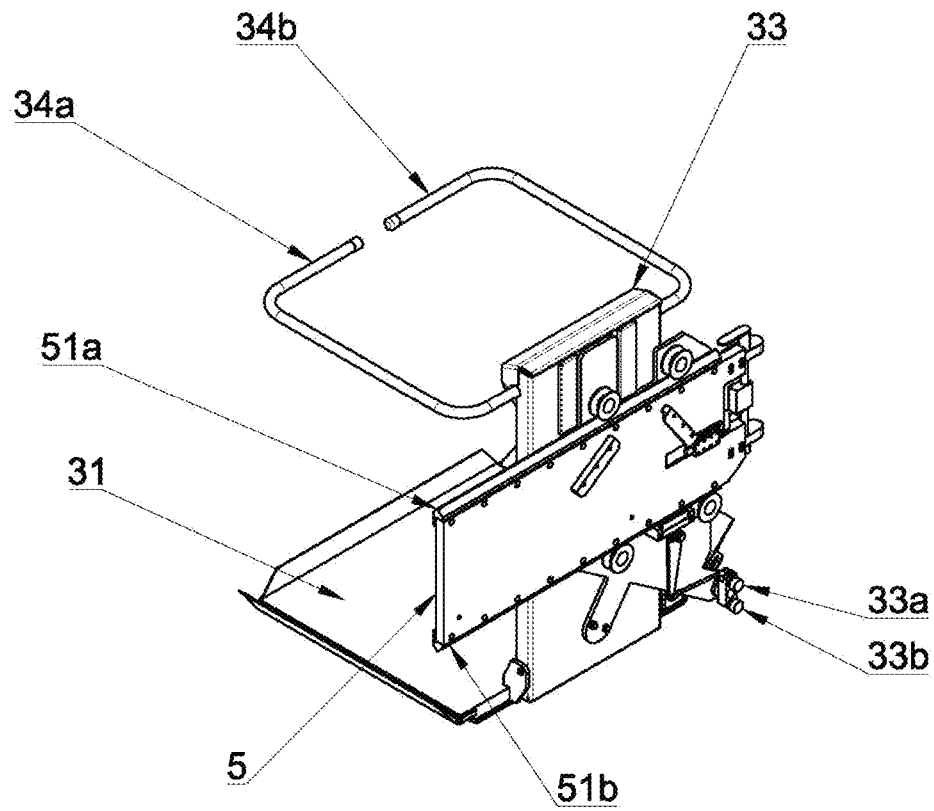
FIG. 8a: A back view of the lifting platform with a plate ensuring horizontal movement
Figure 8B:
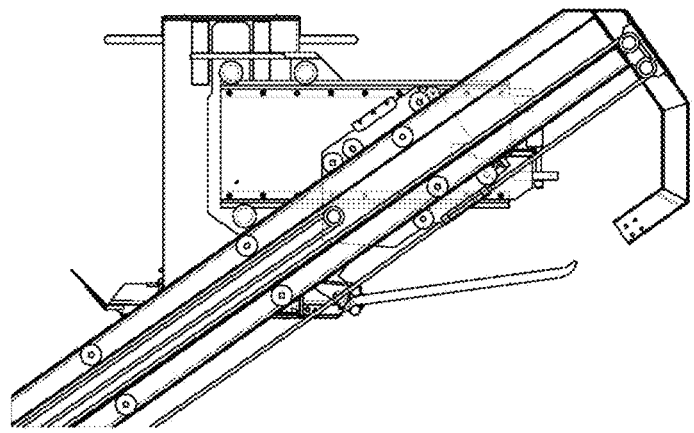
FIG. 8b: The initial state of the horizontal movement of the platform from the interior of the wall of the stairs
Figure 8C:
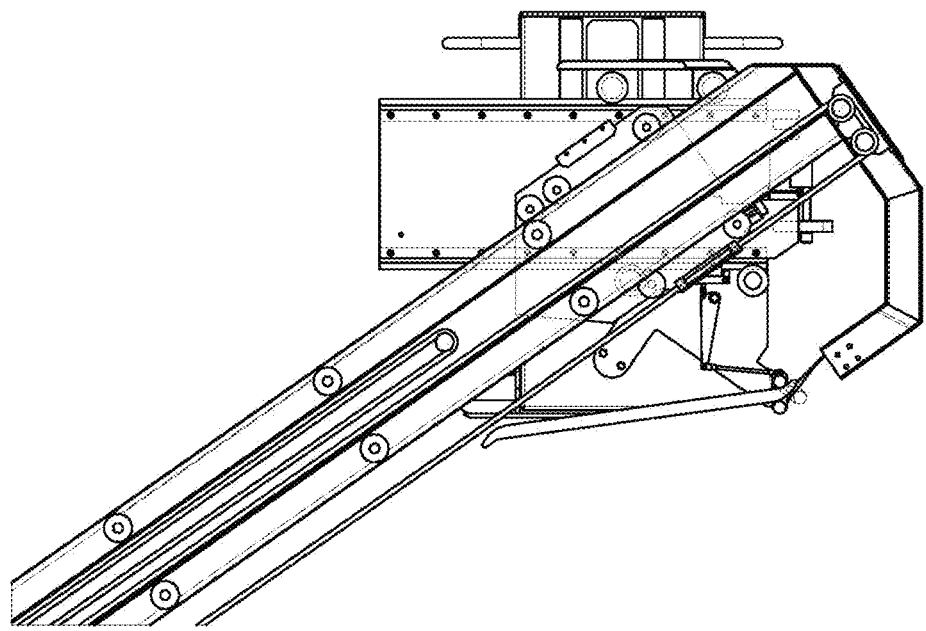
FIG. 8c: The final state of the horizontal movement of the platform from the interior of the wall of the stairs
Figure 9:
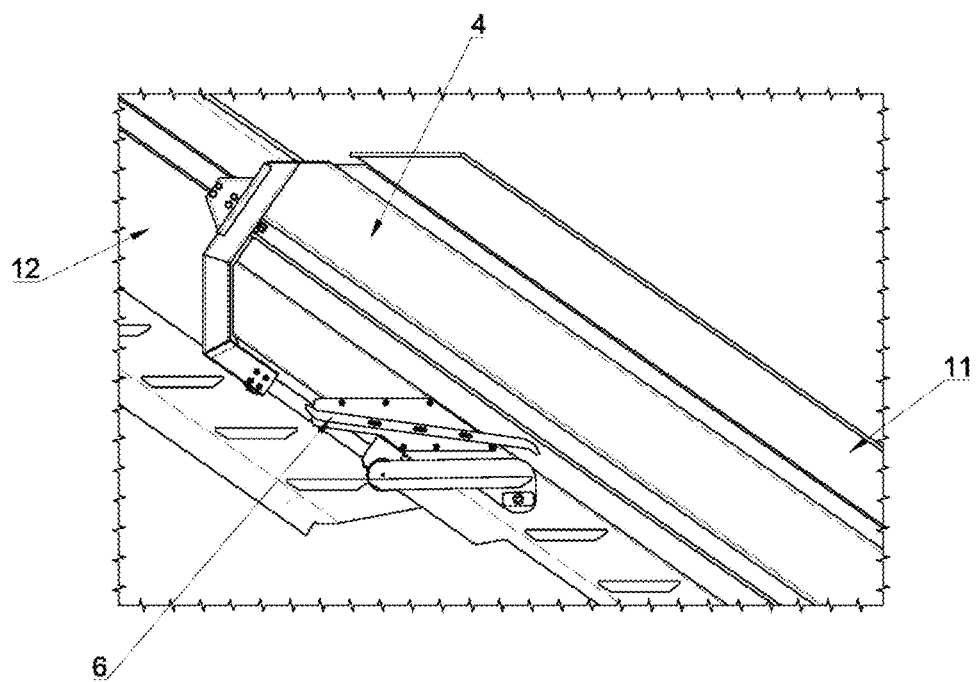
FIG. 9: The rail above the intermediate platform ensuring horizontal movement

In order to move the lifting platform 3 on the rails 51a, b of the horizontal shift plate 5, the rail 6 on the lower staircase above the intermediate platform is present, as well as two wheels 33a, 33b at the back part 33 of the platform 3; said components simultaneously deactivate the friction brake on the rail 6, which is normally used to prevent unpredictable movements of the lifting platform (FIGS. 8a, 8b and 8c). The rail 6 is installed onto the lower staircase above the intermediate platform at an angle allowing the lifting platform 3 to overcome the distance of the intermediate platform, which is approximately the height of one step. Thus, the shift enables passage of the lifting platform 3 onto the upper platform of the passenger stairs, even when the stairs are only extended to a height of one step. The wheels are located on a carrier, which is rotatably mounted onto the axes on the back part of the lifting platform 3 and is connected with the friction brake via the axis and the lever. The position of the wheels 33a, 33b, which are not in contact with the rail 6, is determined by the connection onto the friction brake. When the carriage with the lifting platform moves to contact the rail (from below or above), the wheels are in a neutral position and the friction brake is activated. First, one of the wheels makes contact (the upper wheel when descending, the lower wheel when ascending); through further movement of the platform 3, the wheels rotate around the axis of the support due to the initial contact (counter-clockwise, in line with FIG. 8a or 8b), and the movement deactivates the brake via a lever. Further movement along the guide rail 4 provokes a horizontal movement of the lifting platform 3 due to the fact that the wheels are aligned with the rack on the lower staircase.

If removal of the lifting platform from the staircase is not needed due to storage of the folding platform on the stairs, the carriage 3a and the horizontal shift plate 5 with rails 51a, b do not have to be two separate pieces, but can instead be one suitably manufactured piece. If the horizontal shift system is either not necessary or wanted, the rail and wheels do not have to be built into the lower staircase, and the lifting platform 3 can be permanently installed onto the carriage 3a. Using certain adjustments (a longer ramp of the platform on the upper side, a different form of the carriage and the back part of the lifting platform), the system still allows boarding of passengers. If the lifting platform is stored on the staircase and does not have the horizontal shift, the lift does not need a carriage; instead, the wheels of the carriage 36 can be installed onto the back part 33 of the lifting platform.

The lift 2 according to any of the embodiments can be built into the side 111 of the telescopic passenger stairs 1, namely into its stationary part 11. Preferably, the lift 2 is already installed during manufacture of the telescopic passenger stairs 1. The lower staircase is the main bearing part of the lift apparatus. The side allows installation of the guide wheels 47 for the guide rail 4, and also enables installation of guide wheels 44d,e,f, the drive sprocket 45 and the drive (cylindrical gearing, electric motor) for the endless chain 46. The upper staircase serves as a rail for the guide rail 4 as it moves along the extended staircase.

Figure 10:
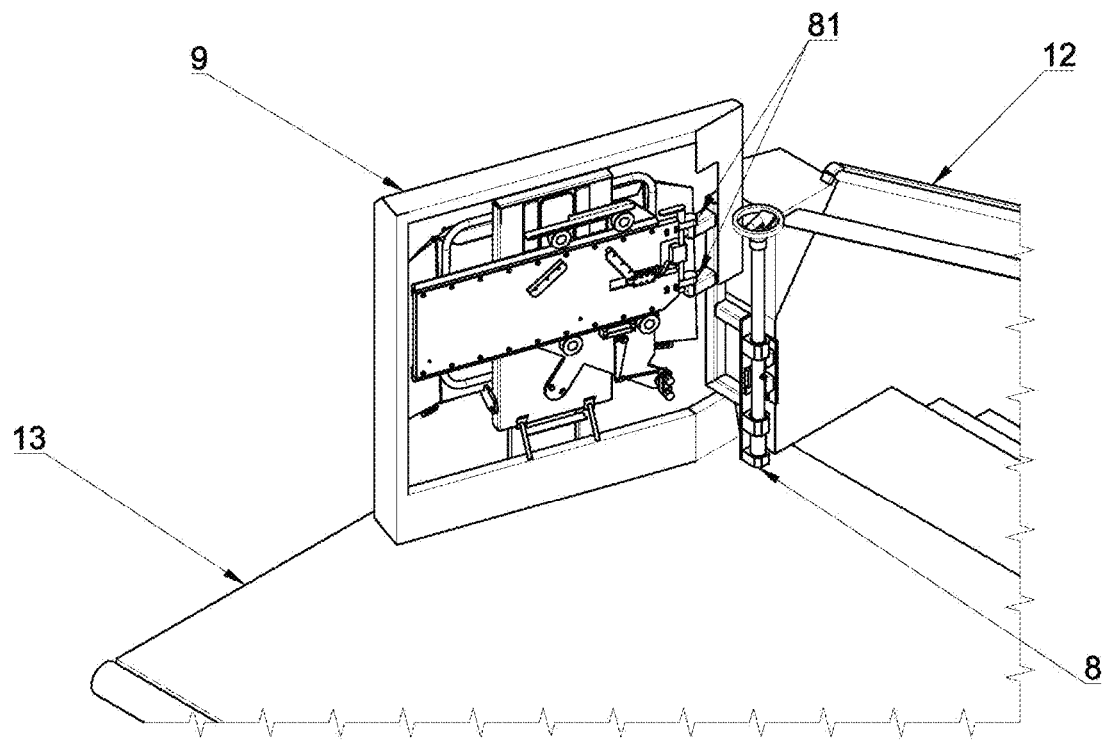
FIG. 10: The crate and arm enabling the storage of the lifting platform when it is not in use

The lift apparatus allows the platform 3 to be stored as shown in FIG. 10 when the lift apparatus is installed onto the telescopic passenger stairs; said storage shall preferably be implemented onto the upper platform representing the upper staircase of the telescopic stairs, thus only leaving the guide rail 4 and the carriage 3a at the bottom of the lower staircase of the stairs. In order to store the platform 3, the top of the upper part of the staircase is provided with an arm 8, which grabs the platform 3 with a raised base part 31 onto two hooks 81 and lifts it from the carriage 3a. At the same time, the lock of the platform onto the carriage must be released. Then, said arm 8 turns around the axis, thus moving the platform into storage space 9, which is preferably shaped as a crate with a tarp or doors.

The lift for telescopic passenger stairs solves the technical problem with a movable guide rail installed into the lower staircase, the rail being able to move up to the top of the upper staircase if needed. The guide rail in the lower, stationary staircase serves as a fixed guide rail for the platform, onto which the passenger in a wheelchair is wheeled, while the guide rail in the upper staircase of the stairs is led along the rail, onto which the guide rail is connected by means of wheels. The lift apparatus enables boarding of passengers in wheelchairs and disabled passengers in a safe and reliable manner. At the same time, the movement of the platform into the position of non-use allows other passengers to board the plane as usual, without disturbance.

What is claimed is:

1. A lift for telescopic passenger stairs enabling passengers with reduced mobility to board a plane, wherein said lift comprises:
   a folding platform onto which a wheelchair can be wheeled;
   the platform being attached to a guide rail with its back part using at least three guide wheels for moving the platform along the guide rail;
   the guide rail being shaped as a long element of an essentially rectangular shape with a cross-section in the shape of a letter C and with a shorter part on one end;
   an endless chain or a wire rope, running within the guide rail on at least one sprocket and at least three guide rollers, which can also be sprockets, wherein said endless chain or wire rope is driven via a drive through a self-locking gear drive for stopping the platform at any point;
   the said guide rail having a lock for locking the platform in place, when it reaches the top of the guide rail; and
wherein the guide rail is arranged to be built into one of the sides of telescopic passenger stairs, and
wherein the endless chain or wire rope within the guide rail enables the platform to move along the guide rail when the platform is in the area of a lower staircase of telescopic stairs, and movement of the guide rail along an upper staircase of telescopic stairs when the platform is at the uppermost point of the guide rail, so that the chain pulls the guide rail upwards with the platform.

2. The lift according to claim 1, the platform is attached to the guide rail via a carriage, which is essentially a plate onto which at least three, preferably five, guide wheels and an anchorage of the said endless chain or wire rope are attached, wherein the carriage allows movement of the platform upwards or downwards along the guide rail and allows the chain to pull the guide rail upwards via the carriage and the platform.

3. The lift according to claim 1, characterised in that it further contains a brake for terminating movement of the platform and/or the guide rail.

4. The lift according to claim 1, wherein the longer part of the guide rail comprises an external profile in the shape of a letter C, and of an external profile in the shape of a letter U.

5. The lift according to claim 1, wherein guide rollers are installed within the guide rail, wherein first rollers are mounted onto the guide rail itself, and second rollers, as well as the drive sprocket, are arranged to be mounted onto the side part of the lower part of telescopic stairs; in that the rollers and the drive sprocket are arranged to be mounted onto the lowermost part of the staircase, while one of the second rollers is arranged to be installed onto the upper part of the staircase; in that one of the first rollers is to be installed onto the lower part, while two of first rollers are arranged to be installed onto the shorter part of the guide rail where additional wheels are mounted, wherein the guide rail is guided onto the upper staircase with additional wheels.

6. The lift according to claim 1, wherein the guide rail with wheels is arranged to be guided on a rail of the upper staircase.

7. The lift according to claim 1, wherein the drive can be electrical, manual, or a combination of both.

8. The lift according to claim 7, wherein the combined drive is enabled with a self-locking gear drive with two exits, wherein one of the exits has an electrical motor and the other has a manual drive device with an actuated crank.

9. The lift according to claim 1, wherein the platform has a base part, two or three inclined ramps, which are movably attached onto the base part, a back part, the bottom part of which is attached onto the base part, and safety barriers attached to the left and the right side of the back part; and the platform optionally has a foldable seat mounted to the front surface of the back part.

10. The lift according to claim 1, wherein a plate for a horizontal shift is attached to the plate of the carriage, wherein said plate has rails mounted onto its upper and lower parts, and wherein the back part of the platform is equipped with at least three additional wheels for moving the lifting platform up and down the rails of the horizontal shift plate; and in that the lift has a lock used to securely lock the platform onto the carriage.

11. The telescopic passenger stairs according to claim 10, wherein the guide rail may be provided with at least one distancing element for moving the guide rail and the platform in one single plane on the lower and the upper staircase of the stairs.

12. The telescopic passenger stairs according to claim 10, wherein shift of the platform along the rails of the horizontal shift plate is enabled by a rail above the intermediate platform of the stairs and with two wheels at the back part of the platform, which simultaneously deactivate a friction brake on the rail that prevents undesirable movements of the platform; and in that the rail is installed onto the lower staircase above the intermediate platform at an angle allowing the platform to overcome the distance of the intermediate platform, which is approximately the height of one step.

13. The telescopic passenger stairs according to claim 10, wherein the platform can be stored when the lift is not in use, wherein the platform is preferably stored on the upper platform of the stairs, and wherein the guide rail and the carriage remain at the bottom of the lower staircase; in that an arm (8) with two hooks for grabbing and lifting the platform from the carriage is mounted onto the upper platform of the stairs in order to store the platform when the lock of the platform on the carriage is released, wherein said arm can rotate around an axis to store the platform into the storage space, which is preferably shaped as a crate with a tarp or doors.

14. The telescopic passenger stairs for boarding and disembarking passengers according to claim 10, wherein primary controls for operating the lift are installed on the upper platform, and that additional controls can also be installed onto the platform itself and/or onto the bottom of the stairs.

15. Telescopic passenger stairs comprising the lift according to claim 1, wherein the lift is installed into one of the sides of the staircase in the lower, stationary part of the stairs, wherein the guide rail is preferably installed onto the side of the lower part of the telescopic staircase for allowing undisturbed movement upwards on the lower staircase of the stairs.

* * * * *